(12) United States Patent
Park et al.

(10) Patent No.: US 7,500,606 B2
(45) Date of Patent: Mar. 10, 2009

(54) METHOD OF SETTLING SIGNATURELESS PAYMENT OF BANK CARD SALES SLIP IN MOBILE TERMINAL, AND SYSTEM THEREFOR

(75) Inventors: Shae Jin Park, Bucheon (KR); Myoung Man Hur, Seoul (KR); Kyung Yang Park, Seoul (KR); Jung Hun Kim, Seoul (KR)

(73) Assignee: Harexinfotech, Inc., Seoul (KR)

( * ) Notice: Subject to any disclaimer, the term of this patent is extended or adjusted under 35 U.S.C. 154(b) by 115 days.

(21) Appl. No.: 11/403,926

(22) Filed: Apr. 14, 2006

(65) Prior Publication Data

US 2007/0241180 A1 Oct. 18, 2007

(51) Int. Cl.
*G06K 5/00* (2006.01)
*G06Q 20/00* (2006.01)

(52) U.S. Cl. .............................. 235/380; 705/16; 705/18
(58) Field of Classification Search ............. 705/16–18, 705/24, 35, 39, 44; 235/380, 379
See application file for complete search history.

(56) References Cited

U.S. PATENT DOCUMENTS

| 6,234,389 | B1 * | 5/2001 | Valliani et al. ............... 235/380 |
| 2003/0075610 | A1 * | 4/2003 | Ong ............................. 235/492 |
| 2005/0091152 | A1 * | 4/2005 | Suisa ............................. 705/39 |

* cited by examiner

Primary Examiner—Daniel A Hess

(74) *Attorney, Agent, or Firm*—Jean C. Edwards, Esq.; Akerman Senterfitt

(57) ABSTRACT

Provided is a method of and system for settling signatureless payment of a slip of bank card sales in a mobile terminal such as a cellular phone, a personal digital assistant, and a smart phone, having a mobile IC (Integrated Circuit) chip card, to then be printed on a transaction approval sales slip, to thereby make personal authentication completed and prevent the sales slip from being forged or fabricated, without signing on a customer's autographical signature of the sales slip. The signatureless payment settlement system has an algorithm for producing a personal authentication value in an IC chip card mounted on the mobile terminal including the cellular phone or PDA (Personal Digital Assistant), and receives a card issuing company key, card issuing information, a card password, an IC chip card produced random number to produce a personal authentication value. Then, the signatureless payment settlement system transmits the generated authentication value to the mobile payment settlement terminal in a card affiliated shop together with the card information through an IR (Infrared Ray), RF (Radio Frequency), or bluetooth communication, to then make the personal authentication value printed on the customer signature column of the sales slip output from the credit card inquiring machine (CAT) or the POS (Point of Sales) system, at the time when a transaction is approved. Accordingly, the signatureless payment settlement system solves inconveniences that a customer who uses a card should sign on a slip of sales at a card affiliated shop, and shortens a card transaction approval time. Also, when a validity of transaction by use of a card is challenged, a card issuing company can confirm the validity of the card use for verification. As a result, the signatureless payment settlement system can prevent forgery, fabrication, or falsification of the sales slip, to thereby prevent an illegal card use.

12 Claims, 6 Drawing Sheets

FIG. 5

| TERMINAL NUMBER | | | SLIP NUMBER |
|---|---|---|---|
| 151544214 | | | 050055 |
| KIND OF CARD ○○ CARD | | | |
| MEMBERSHIP NUMBER 4200556341257458 | | | |
| VALID DATE | TRANSACTION DATE | | CANCEL DATE |
| | 04/09/09 21:30 | | |
| TRANSACTION TYPE APPOVAL OF CREDIT | | ITEM | |
| SETTLEMENT METHOD | AMOUNT OF MONEY | | 50000 |
| NAME OF SHOP | VALUE ADDED TAX | | 5000 |
| SELLER | TIP | | |
| BANK CONFIRMATION ○○CARD(SEAL) | TOTAL SUM | | 55000 |
| REPRESENTATIVE HONG GILDONG | APPROVED NUMBER | | |
| NAME OF AFFILIATED SHOP | | | |
| NOTICE XXNET SUBMIT 22778051 | | | |
| ADDRESS | | | |
| NUMBER OF AFFILIATED SHOP 31256985 | | | |
| BUSINESS REGISTRATION NUMBER 201-08-27458 | | | |
| CALL 1544-1000 | | | SIGNATURE 7F45 1A3B BC9C |

METHOD OF SETTLING SIGNATURELESS PAYMENT OF BANK CARD SALES SLIP IN MOBILE TERMINAL, AND SYSTEM THEREFOR

BACKGROUND OF THE INVENTION

1. Field of the Invention

The present invention relates to an IC (Integrated Circuit) chip based mobile card payment, and more particularly, to a method of and system for settling signatureless payment of a slip of bank card sales in a mobile terminal, in which an authentication value is produced for ascertaining whether or not a card user is a true person in a mobile IC chip card, to then be printed on a transaction approval sales slip, to thereby make personal authentication completed without signing on the sales slip.

2. Description of the Related Art

Recently, as a payment settlement tool, plastic magnetic cards and IC (Integrated Circuit) attachment type cards convenient to use and handy to carry are widely being used in comparison with cash. The cards are classified into a credit card, a cash card, a debit card, an advance payment card such as a gift card, a traffic card and so on according to a payment settlement method.

In the case of the plastic magnetic cards or the IC attachment type cards, a card affiliated store person allowing customers to use various types of cards at the time of commercial transactions, confirms whether or not an approval is accomplished for a user's card in order to confirm whether or not a card user is a true person. Then, the card user signs on a transaction approved sales slip. Then, the card affiliated store person confirms whether the signature on the transaction approved sales slip with that on the back of the card fits to check whether the card user is the true person.

This is based on Korea Credit Financing Law Article 19 Term 2, stating "Whenever transactions by credit cards are performed, credit card affiliated shops should confirm whether or not the credit cards are duly being used by a legally true person." Thus, it is visually checked whether or not a signature signed on the back of the plastic card is same as that signed on the sales slip, by the card affiliated store person. If both signatures are same, the transaction is approved as a normal commercial transaction. If not, the card affiliated store person requests the card user to show an identification certificate, in order to confirm whether or not the card user is a true person. The personal authentication method of authenticating a plastic card owner will be described briefly below with reference to FIG. 1.

FIG. 1 is a flowchart view showing a general plastic (a magnetic strip or IC) card business processing flow.

In FIG. 1, if a customer provides a card for settling a payment to an owner of a card affiliated shop (1), the owner of the card affiliated shop swaps the card which the customer provided into a card reader (MSR) of a card inquiring machine (CAT) or a POS (Point of Sales) system, or reads card information by a contact or contactless RF mode, and inputs the amount of money including spent money, service charges, etc., and the number of installment months in the case of allotment transactions (2). Next, the card affiliated shop owner requests for an approval of the transaction to a card issuing company (a target card publisher) via a van network with which the card inquiring machine (CAT) or the POS (Point of Sales) system is connected, for the validation of the card (3). The card issuing company determines an approval or disapproval for use of the target card and responds to the card inquiring machine (CAT) or the POS (Point of Sales) system which requested for the approval or disapproval of the transaction via a VAN company (4). If the transaction is approved in the trade approval request result, the card inquiring machine (CAT) or the POS (Point of Sales) system outputs a transaction detail on a slip of sales together with an approval acknowledgement number (5). The owner of the card affiliated shop asks the customer to sign on a signature column of the output slip of sales by an autograph of the customer (6). The customer signs his or her autograph on the sales slip and transfers the sales slip to the owner of the card affiliated shop (7). Comparing the customer signature on the sales slip with a signature signed on the back of the card, the owner of the card affiliated shop confirms whether or not the signed person is a legally true person of the card possessor (8), and then the owner of the card affiliated shop returns the card to the customer and provides a sheet of a sales slip receipt for the customer (9).

In the meantime, a mobile IC (Integrated Circuit) card which is mounted in a cellular phone is alternative to a plastic (IC or magnetic strip) card form. Since a number of prior art references are already disclosed in connection with financial transactions using the mobile IC (Integrated Circuit) card, the description thereof will be omitted.

The personal authentication for the mobile IC (Integrated Circuit) card will be described below with reference to FIG. 2.

FIG. 2 is a flowchart view showing a conventional IC chip based mobile payment flow.

In FIG. 2, if the owner of the card affiliated shop requests for settling a payment via a mobile card of a customer (1), the customer inputs a password of the card which the customer uses to settle a payment through a mobile terminal including a cellular phone or a PDA (Personal Digital Assistant) (2). The IC chip card which is built in the mobile terminal compares the password which the customer has input with a password stored in the IC chip for verification (3). In case of being an error, a re-input of the password is demanded. If it is determined that the password is correct in the result of the password verification, the corresponding card information is delivered to the mobile terminal (4). The mobile terminal transmits the card information delivered from the IC chip card to a mobile payment terminal of the card affiliated shop using a local radio communication or a local infrared communication, and the mobile payment terminal transmits the card information to the card inquiring machine (CAT) or the POS (Point of Sales) system (5). The owner of the card affiliated shop inputs the amount of money including spent money, service charges, etc., and the number of installment months in the case of allotment transactions into the card inquiring machine (CAT) or the POS (Point of Sales) system (6), and requests for an approval of the transaction to a card issuing company (a target card publisher) via a van network with which the card inquiring machine (CAT) or the POS (Point of Sales) system is connected, for the validation of the card (7).

The card issuing company determines an approval or disapproval for use of the target card and responds to the card inquiring machine (CAT) or the POS (Point of Sales) system which requested for the approval or disapproval of the transaction via a VAN company (8). If the transaction is approved in the trade approval request result, the card inquiring machine (CAT) or the POS (Point of Sales) system outputs a transaction detail on a slip of sales together with an approval acknowledgement number (9). The owner of the card affiliated shop asks the customer to sign on a signature column of the output slip of sales by an autograph of the customer (10). The customer signs his or her autograph on the sales slip and transfers the signed sales slip to the owner of the card affiliated shop (11). Then, the owner of the card affiliated shop provides a sheet of a sales slip receipt for the customer (12).

However, the mobile IC (Integrated Circuit) card as described above may cause problems that it cannot be identified whether or not the card owner is a legally true person although a signature of a customer is written on a slip of sales autographically at an affiliated shop, since there is no embossing information which enables the owner of the card affiliated shop to identify whether a card possessor is a legally true person, or the card owner cannot sign on the IC card surface.

Of course, in the case of the mobile card, a password or PIN (Personal Identification Number) is confirmed for authenticating whether or not a customer is a legally true person at the time of mobile card payment, for personal authentication, to then allow the transaction. However, there is no method of performing the personal authentication on the sales slip accurately or for post factum verification, and thus no method of preventing forgery, fabrication, or falsification of the sales slip.

SUMMARY OF THE INVENTION

To solve the above problems of the conventional art, it is an object of the present invention to provide a method of and system for settling signatureless payment of a slip of bank card sales for mobile payment in a mobile terminal, in which a password or a PIN (Personal Identification Number) is verified in order to confirm whether or not a customer is a legally true person who can use a mobile IC chip card, and a personal authentication value for ascertaining whether or not a card user is a true person is produced in the mobile IC chip card, if the card user is a legally true person in the result of confirmation of the password or PIN, to then be transferred to a deal approval card inquiring machine (CAT) or the POS (Point of Sales) system and to thus be printed on a slip of sales, for use as a personal authentication identification mark, and to thereby make personal authentication completed without having a customer sign on the sales slip.

To accomplish the above object of the present invention, there is provided a method of settling signatureless payment of a slip of bank card sales for mobile payment in a mobile terminal, by use of a method of confirming personal identification during payment settlement of a mobile terminal which is provided with an IC (Integrated Circuit) chip card, the signatureless payment settlement method comprising the steps of: (a) comparing a password of the IC chip card which is used for payment settlement and is input through the mobile terminal with a prestored password so as to be verified in the IC chip card; (b) producing an authentication value through an algorithm installed in the IC chip card if both the passwords are same; (c) transmitting the produced authentication value and card information to a mobile payment settlement terminal in a card affiliated shop via the mobile terminal; (d) confirming validity of the card in a card inquiring machine (CAT) or the POS (Point of Sales) system if the produced authentication value and the card information have been transmitted via the mobile payment settlement terminal; and (e) printing the authentication value on a customer's signature column of a slip of sales as a personal authentication identification indication if it is approved to use a corresponding card in the result of the confirmation result.

There is also provided an apparatus for settling signatureless payment of a slip of bank card sales in a mobile terminal, for use in a mobile payment settlement system, the bank card sales slip signatureless payment settlement apparatus comprising: an IC (Integrated Circuit) chip storing an issued card and producing a personal authentication value, using a built-in algorithm if a password which a customer inputs through a mobile terminal is compared with a password stored in the IC chip card for verification, and thus both the passwords are same; the mobile terminal which is embedded with the IC chip and is used as a mobile card, and which transfers the customer's password which is input at the time of settling a mobile payment to the IC chip and transmits an authentication value produced in the IC chip and card information to a mobile payment settlement terminal; the mobile payment settlement terminal which receives the card information and the authentication value from the mobile terminal to then be transferred to a card inquiring machine; the card inquiring machine (CAT) or the POS (Point of Sales) system for outputting a transaction detail on a slip of sales together with an approval acknowledgement number if a transaction is approved, and which receives transaction money and requests for a transaction approval if the card information and the authentication value have been received from the mobile payment settlement terminal, to then receive a response to the transaction approval request; and a card issuing company system which receives the transaction approval request from the card inquiring machine (CAT) or the POS (Point of Sales) system and determines whether or not it is approved to use the corresponding card, to thus respond to the transaction approval to the card inquiring machine, wherein the card inquiring machine (CAT) or the POS (Point of Sales) system prints the authentication value on a signature value on a signing column of the sales slip in order to indicate personal authentication identification.

BRIEF DESCRIPTION OF THE DRAWINGS

The above and other objects and advantages of the present invention will become more apparent by describing the preferred embodiment thereof in more detail with reference to the accompanying drawings in which:

FIG. 5 shows an example of a slip of sales produced by the present invention.

DETAILED DESCRIPTION OF THE INVENTION

A method of and system for settling signatureless payment of a slip of bank card sales in a mobile terminal according to a preferred embodiment of the present invention will be described with reference to the accompanying drawings.

Figure 1:
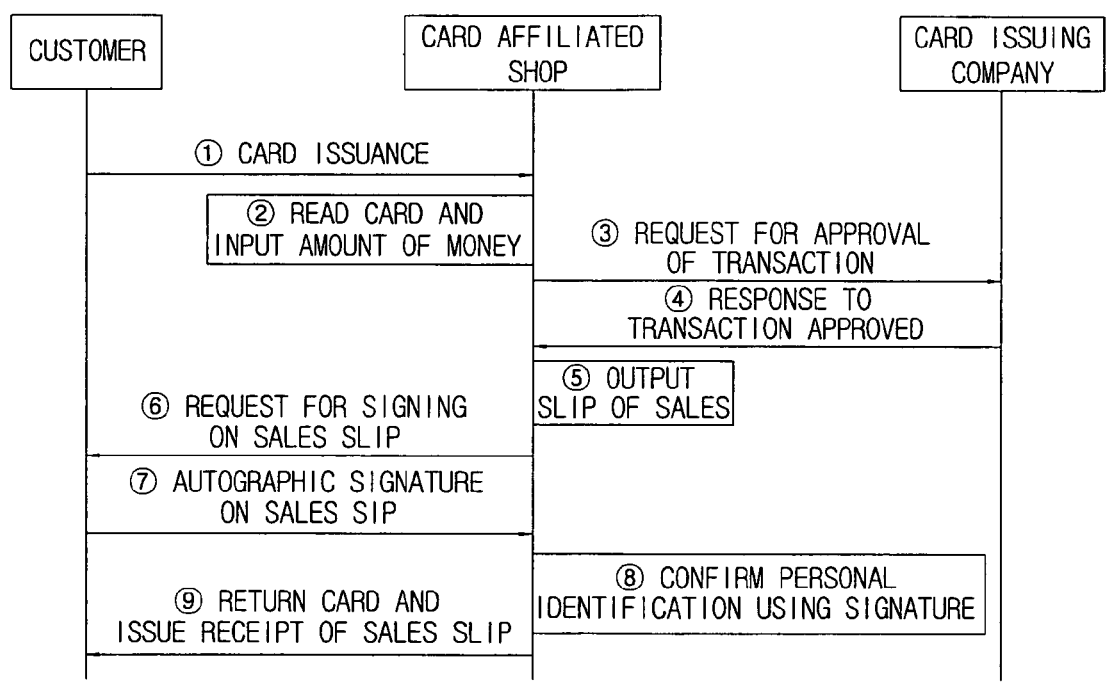
FIG. 1 is a flowchart view illustrating a method of performing personal authentication of a general plastic type bank card.
Figure 2:
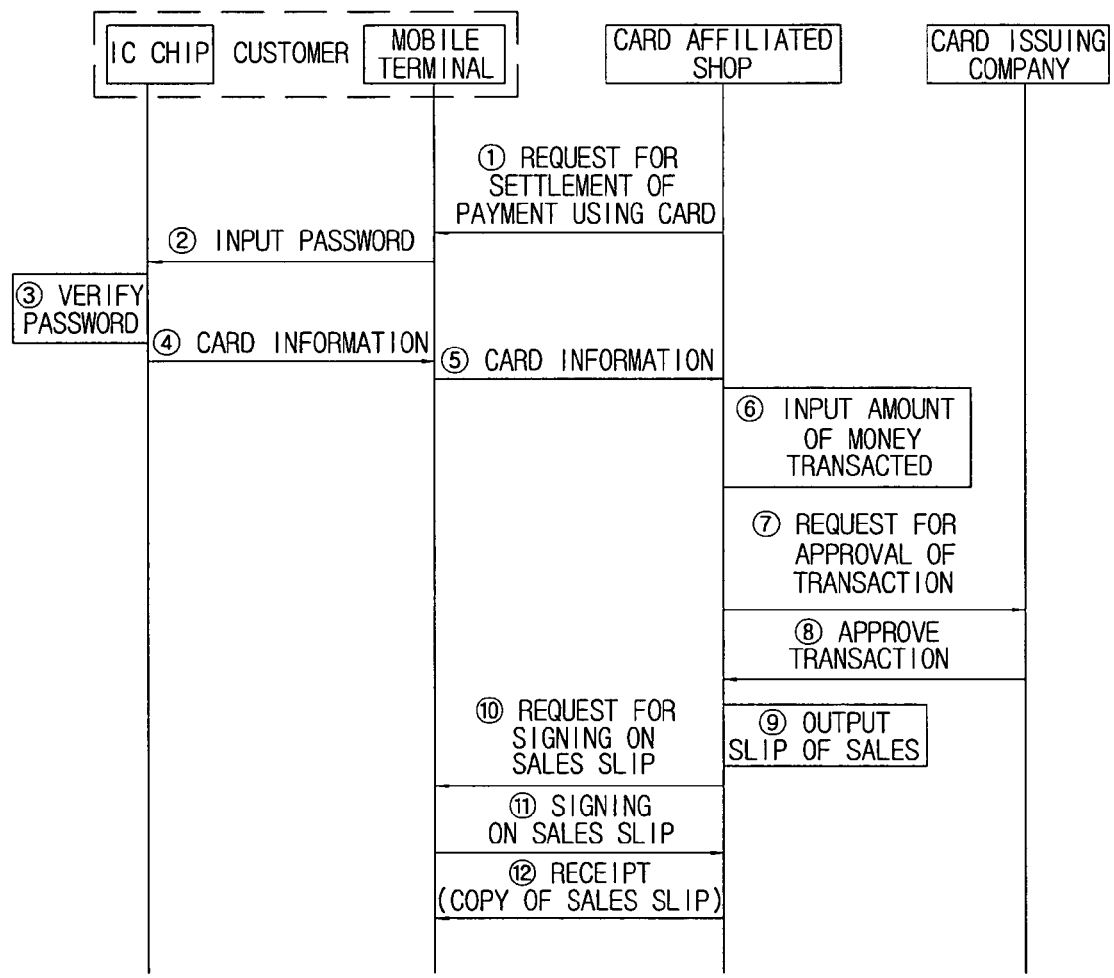
FIG. 2 is a flowchart view illustrating a method of performing personal authentication of a bank card in conventional settlement of a mobile payment.
Figure 3A:
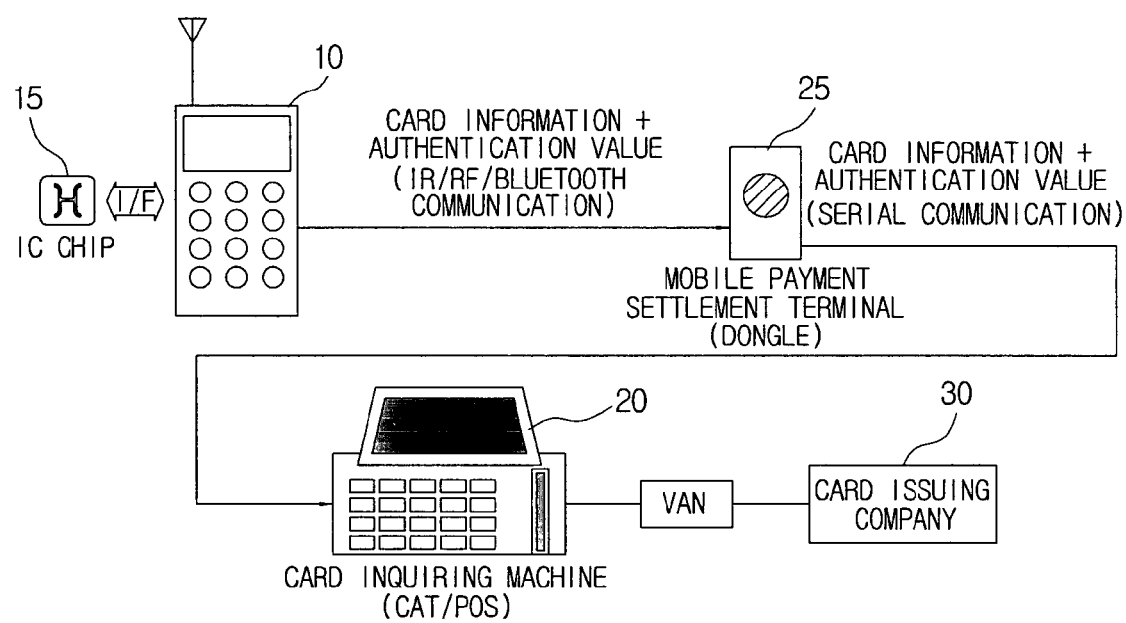
FIGS. 3A and 3B show a configuration of a mobile payment settlement system to which the present invention is applied.
Figure 3B:
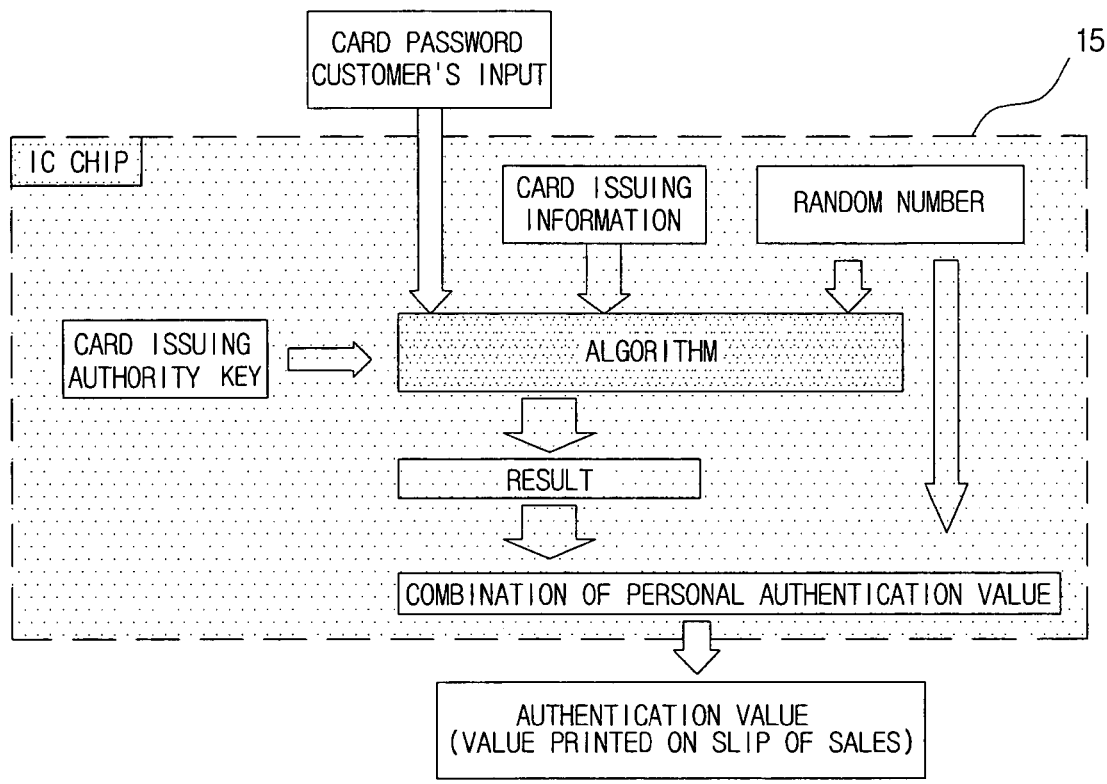

FIGS. 3A and 3B show a configuration of a mobile payment settlement system to which the present invention is applied. A system shown in FIG. 3A includes an IC chip card 15 in which an issued card is stored, and a mobile terminal 10 such as a cellular phone or a PDA (Personal Digital Assistant), which is provided with the IC chip card 15 mounted on a socket so as to be used as a mobile card. Here, as shown in FIG. 3B, the IC chip card 15 contains a built-in algorithm for producing a personal authentication value. The FIG. 3A system also includes a mobile payment settlement terminal 25 which is installed in a card affiliated shop and receives card information including an authentication value through communications with the mobile terminal 10 in which the IC chip card 15 has been mounted, and a card inquiring machine (CAT) or the POS (Point of Sales) system 20 which receives the card information including the received authentication value and requests for an approval of transaction, to thus receive a response to the transaction approval request and output a slip of sales. A detailed operation for signatureless settling the sales slip in the mobile payment settlement system of FIGS. 3A and 3B having a configuration as described above, will be described with reference to FIGS. 4 and 5.

Figure 4:
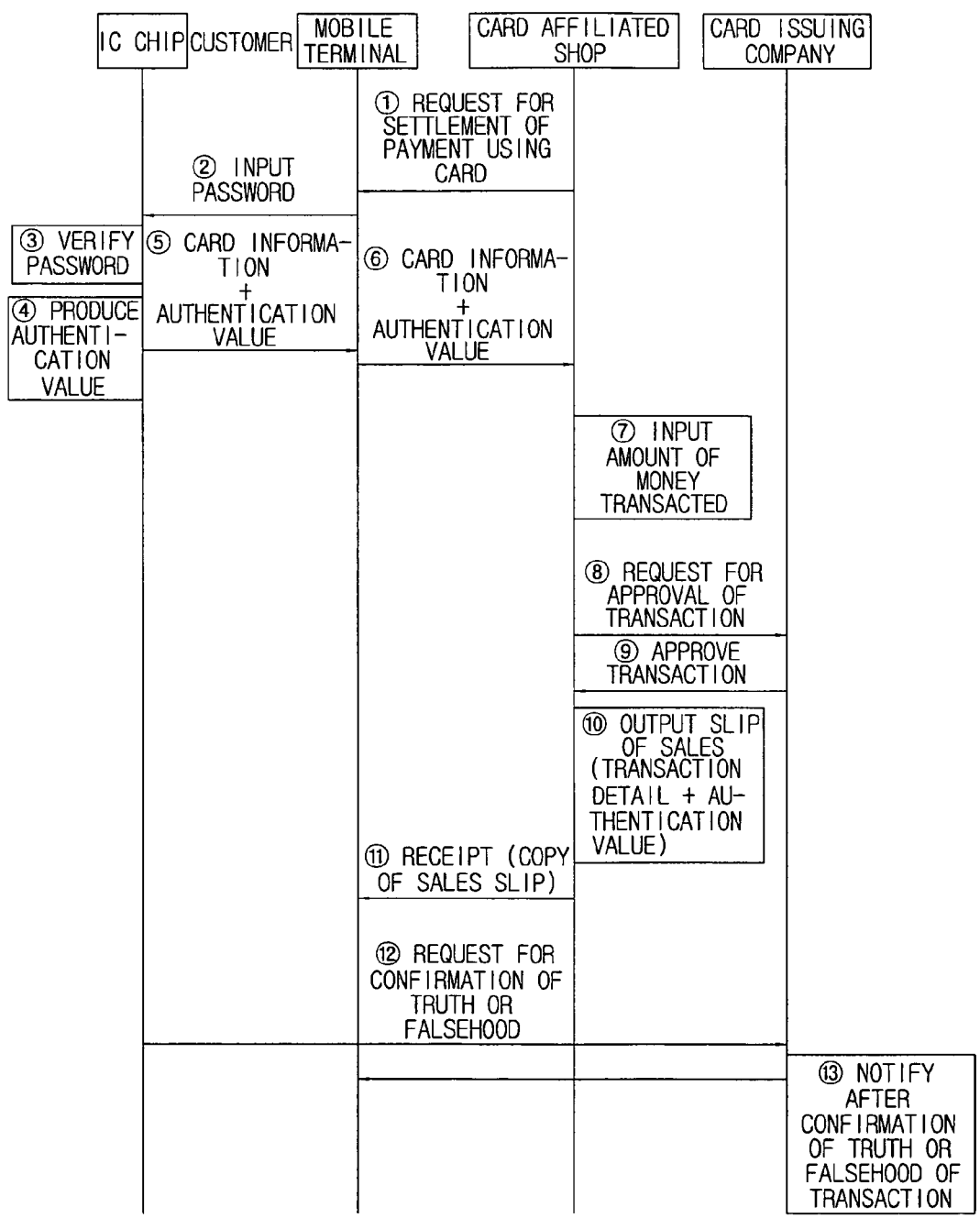
FIG. 4 is a flowchart view illustrating a method of performing personal authentication of a bank card in settlement of a mobile payment.

In FIG. 4, if an owner of a card affiliated shop requests settlement of a payment to a customer using a mobile card (1), he or she inputs a password of the mobile card which is used for settlement of a payment through the mobile terminal 10 including a cellular phone or a PDA (2). The IC chip card 15 mounted on the mobile terminal 10 compares and verifies the password which the customer has input with a password stored in the IC chip, or compares and verifies whether or not a card user is a legally true person using a personal authentication algorithm, without storing a customer's payment settlement password (PIN) (3). If a re-input of a password is demanded in the case of being an error, both the passwords are same in the result of password verification, an authentication value is produced using the input password, a corresponding card issuing company key, card information, and a random number which is produced in the IC card by a Get Challenge command (4).

In general, the "Get Challenge" command is a command which generates a random number in order to perform an "External Auth" which is used to authenticate outside external apparatuses such as a connection device and the other cards in the card. The random number is used in order to prevent a sales slip authentication value from being identical. The algorithm used for producing the authentication value uses an authorized encoding function including a hash function, DES (Data Encryption Standard), a SEED, etc. Also, the algorithm used for the authentication value production is built in the IC chip card 15. As shown in FIG. 3B, the algorithm built in the IC chip card 15 produces an authentication value, using a card issuing company key, card issuing information, a card password, a random number as input values. Here, the card issuing company key is a key value which is produced in a card issuing company and managed so that only the card issuing company knows. Also, the card issuing company key is stored in the IC chip card 15. The card issuing information is stored in the IC chip card 15 as the card information which is issued from the card issuing company, that is, a card number, a valid date, etc. The card password is the password which the customer directly inputs during use of the card, which is not stored in the IC chip card 15. That is, the card password is a value which only the customer knows, that is, a value which is set as a card password when the customer applies the card. In the IC chip card 15, the random number is a value produced by a "Get Challenge" command, and includes a sixteen byte value, or a partial combination (From~TO).

As shown in FIG. 3B, the authentication value is produced by concatenating the resulting value produced via the algorithm and the random number.

The IC chip card 15 transfers the corresponding card information and the generated authentication value to the mobile terminal 10 (5). By using a local infrared ray (IR) communication, a local radio frequency (RF) wave communications, or a short-range wireless (BLUETOOTH™) communication, the mobile terminal 10 transmits the transferred authentication value and card information to the mobile payment settlement terminal 25 in the card affiliated shop, and the mobile payment settlement terminal 25 transmits the card information to the card inquiring machine (CAT) or the POS (Point of Sales) system 20 (6). Here, the mobile terminal 10 and the mobile payment settlement terminal 15 communicate with each other by the IR, RF or short-range wireless (BLUETOOTH™) communications. The mobile payment settlement terminal 25 and the card inquiring machine (CAT) or the POS (Point of Sales) system 20 communicate with each other by a serial communication.

The owner of the card affiliated shop inputs the amount of money including spent money, service charges, etc., and the number of installment months in the case of allotment transactions into the card inquiring machine (CAT) or the POS (Point of Sales) system (7), and requests for an approval of the transaction to a card issuing company (a target card publisher) via a van network with which the card inquiring machine (CAT) or the POS (Point of Sales) system 20 is connected, for the validation of the card (8).

The card issuing company 30 determines an approval or disapproval for use of the target card and responds to the card inquiring machine (CAT) or the POS (Point of Sales) system 20 which requested for the approval or disapproval of the transaction via a VAN company (9). If the transaction is approved in the trade approval request result, the card inquiring machine (CAT) or the POS (Point of Sales) system 20 outputs a transaction detail on a slip of sales together with an approval acknowledgement number (10). In this case, as shown in FIG. 5, a personal identification authentication value such as "7F45 1A3B BC9C" is printed on a customer signature column of a slip of sales. Accordingly, the customer does not need to sign on the sales slip autographically. Then, the owner of the card affiliated shop provides the customer with a sheet of a sales slip receipt where the personal identification authentication value has been printed (11).

The owner of card affiliated shop or the customer requests the truth of the sales slip to the corresponding card issuing company (12). Then, the card issuing company produces an authentication value through an algorithm based on the card information printed on the sales slip, the card password of the customer's ledger, the card issuing company key, and the random number printed on the sales slip, in order to confirm whether or not the authentication value on the requested sales slip is true. The authentication value is configured by combination with the random number and is compared with the authentication value printed on the sales slip, to thereby determine whether or not the authentication is true and notify the determined result to the party who requested the truth or falsehood of the authentication value (13). Here, the authentication value can be added to a purchase slip in order to confirm whether or not a slip of sales is valid during purchasing, and utilized for verification together with an approval acknowledgement number.

As described above, the present invention provides a method of and system for settling signatureless payment of a slip of bank card sales in a mobile terminal, in which an authentication value for ascertaining whether or not a card user is a true person in a mobile IC chip card, to then be printed on a transaction approval sales slip, instead of a customer's autographic signature, to thereby make personal authentication completed without signing on the sales slip. Accordingly, the present invention solves inconveniences that a customer who uses a card should sign on a slip of sales at a card affiliated shop, and shortens a card transaction approval time. Also, when a validity of transaction by use of a card is challenged, a card issuing company can confirm the validity of the card use for verification. As a result, the present invention can prevent forgery, fabrication, or falsification of the sales slip, to thereby prevent an illegal card use and escape a risk due to an illegal purchase of slips of sales.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A method of settling signatureless payment of a slip of bank card sales for mobile payment in a mobile terminal, by use of a method of confirming personal identification during payment settlement of a mobile terminal which is provided with an IC (Integrated Circuit) chip card, the signatureless payment settlement method comprising the steps of:
   (a) comparing a password of the IC chip card which is used for payment settlement and is input through the mobile terminal with a prestored password so as to be verified in the IC chip card;
   (b) producing an authentication value using an input password, a stored corresponding card issuing company key and card issuing information, and a random number which is produced in the IC card if both the passwords are same;
   (c) transmitting the produced authentication value and card information to a mobile payment settlement terminal in a card affiliated shop via the mobile terminal;
   (d) confirming validity of the card in a card inquiring machine (CAT) or the POS (Point of Sales) system if the produced authentication value and the card information have been transmitted via the mobile payment settlement terminal; and
   (e) printing the authentication value on a customer's signature column of a slip of sales as a personal authentication identification if it is approved to use a corresponding card in the result of the confirmation result.

2. The signatureless payment settlement method according to claim 1, further comprising the step of (f) the card issuing company determining whether or not the sales slip is true based on the authentication value printed on the sales slip.

3. The signatureless payment settlement method according to claim 2, wherein said step (f) comprises the sub-steps of:
   (f1) if the owner of card affiliated shop or the customer requests the truth of the sales slip to the corresponding card issuing company, the card issuing company producing an authentication value through an algorithm based on the card information and the random number printed on the sales slip, the card password of a customer's ledger, the card issuing company key, in order to confirm whether or not the authentication value on the requested sales slip is true;
   (f2) configuring the authentication value by combination with the random number and comparing the authentication value with the authentication value printed on the sales slip, to thereby determine whether or not the authentication is true; and
   (f3) notifying the determined result to the party who requested the truth or falsehood of the authentication value.

4. The signatureless payment settlement method according to claim 1, wherein said step (b), the input password, the stored corresponding card issuing company key and card issuing information, and a generated random number are input into an enciphering algorithm which is included in the IC chip card, and then a combination of an output value passing through the algorithm with the random number is produced as a personal authentication value.

5. The signatureless payment settlement method according to claim 4, wherein an authorized enciphering function algorithm of a hash function, DES, or SEED is used in said step (b).

6. The signatureless payment settlement method according to claim 1, wherein the card information and the authentication value are transferred through a local infrared ray or radio frequency communication, and a short-range wireless communication in step (c).

7. An apparatus for settling signatureless payment of a slip of bank card sales in a mobile terminal, for use in a mobile payment settlement system, the bank card sales slip signatureless payment settlement apparatus comprising:
   an IC (Integrated Circuit) chip storing an issued card and producing a personal authentication value, using a built-in algorithm if a password which a customer inputs through a mobile terminal is compared with a password stored in the IC chip card for verification, and thus both the passwords are the same;
   the mobile terminal which is embedded with the IC chip and is used as a mobile card, and which transfers the customer's password which is input at the time of settling a mobile payment to the IC chip and transmits an authentication value produced in the IC chip and card information to a mobile payment settlement terminal;
   the mobile payment settlement terminal which receives the card information and the authentication value from the mobile terminal to then be transferred to a card inquiring machine;
   the card inquiring machine (CAT) or the POS (Point of Sales) system for outputting a transaction detail on a slip of sales together with an approval acknowledgement number if a transaction is approved, and which receives transaction money and requests for a transaction approval if the card information and the authentication value have been received from the mobile payment settlement terminal, to then receive a response to the transaction approval request; and
   a card issuing company system which receives the transaction approval request from the card inquiring machine (CAT) or the POS (Point of Sales) system and determines whether or not it is approved to use the corresponding card, to thus respond to the transaction approval to the card inquiring machine, wherein the card inquiring machine (CAT) or the POS (Point of Sales) system prints the authentication value on a signature value on a signing column of the sales slip in order to indicate personal authentication identification.

8. The signatureless payment settlement apparatus according to claim 7, wherein the IC chip produces the random number in order to prevent the authentication value from being produced identically.

9. The signatureless payment settlement apparatus according to claim 8, wherein the algorithm which is built in the IC chip uses an authorized enciphering function.

10. The signatureless payment settlement apparatus according to claim 9, wherein the IC chip receives a corresponding card issuing company key and card issuing information, a generated random number, and an input password, as inputs to an algorithm and then combines an output value passing through the algorithm with the random number, to thereby produce a personal authentication value.

11. The signatureless payment settlement apparatus according to claim 7, wherein a local infrared ray communication, a radio frequency communication, or a short-range wireless communication is performed between the mobile terminal and the mobile payment settlement terminal, and a serial communication is performed between the mobile payment settlement terminal and the credit card inquiring machine (CAT) or the POS (Point of Sales) system.

12. The signatureless payment settlement apparatus according to claim 7, wherein the card issuing company system produces an authentication value based on the card information and the random number which are printed on the sales slip, a card password of a custom ledger, and a card issuing company key through an algorithm, to then configures the authentication value through combination of the random number and compares the authentication value with an authentication value printed on the sales slip to thereby determine truth or falsehood of the authentication value and to them perform a post verification.

* * * * *